No. 765,042. PATENTED JULY 12, 1904.
F. N. ROGERS.
ORE CONCENTRATOR.
APPLICATION FILED MAR. 3, 1902. RENEWED JUNE 11, 1903.
NO MODEL. 6 SHEETS—SHEET 1.

WITNESSES
Elmer Seavey
Sarah V. Lockwood

INVENTOR
Fred N. Rogers
by Geo. N. Hamlin
his Attorney

No. 765,042. PATENTED JULY 12, 1904.
F. N. ROGERS.
ORE CONCENTRATOR.
APPLICATION FILED MAR. 3, 1902. RENEWED JUNE 11, 1903.
NO MODEL. 6 SHEETS—SHEET 2.

WITNESSES
Elmer Seavey
Sarah V. Lockwood

INVENTOR
Fred N. Rogers
by Geo. R. Sanlin
his Attorney

No. 765,042. PATENTED JULY 12, 1904.
F. N. ROGERS.
ORE CONCENTRATOR.
APPLICATION FILED MAR. 3, 1902. RENEWED JUNE 11, 1903.
NO MODEL. 6 SHEETS—SHEET 3.

Witnesses
Elmer Seavey
Sarah V. Lockwood

Inventor
Fred N. Rogers
By Geo. H. Lambin
his Attorney

No. 765,042. PATENTED JULY 12, 1904.
F. N. ROGERS.
ORE CONCENTRATOR.
APPLICATION FILED MAR. 3, 1902. RENEWED JUNE 11, 1903.
NO MODEL. 6 SHEETS—SHEET 4.

No. 765,042. PATENTED JULY 12, 1904.
F. N. ROGERS.
ORE CONCENTRATOR.
APPLICATION FILED MAR. 3, 1902. RENEWED JUNE 11, 1903.
NO MODEL. 6 SHEETS—SHEET 5.

No. 765,042. PATENTED JULY 12, 1904.
F. N. ROGERS.
ORE CONCENTRATOR.
APPLICATION FILED MAR. 3, 1902. RENEWED JUNE 11, 1903.
NO MODEL. 6 SHEETS—SHEET 6.

Witnesses
Elmer Seavey

Inventor
Fred N. Rogers
Geo. A. Hamlin
Attorney

No. 765,042.

Patented July 12, 1904.

UNITED STATES PATENT OFFICE.

FRED N. ROGERS, OF DENVER, COLORADO.

ORE-CONCENTRATOR.

SPECIFICATION forming part of Letters Patent No. 765,042, dated July 12, 1904.

Application filed March 3, 1902. Renewed June 11, 1903. Serial No. 161,050. (No model.)

*To all whom it may concern:*

Be it known that I, FRED N. ROGERS, a citizen of the United States, residing at Denver, county of Arapahoe, and State of Colorado, have invented certain new and useful Improvements in Ore-Concentrators, of which the following is a specification.

My invention relates to ore-concentrators of that general type embracing a plurality of separate shaking concentrating-surfaces each discharging concentrates, over which the pulp is moved by the combined action of the surfaces and wash-water directed thereover and passes in succession over the different surfaces of the series.

In ore-concentrating machines of the type specified, wherein concentrates may be discharged from each of a series of concentrating-surfaces and portions of unconcentrated pulp delivered to a succeeding surface for further concentration, it has been customary to deliver such material for further concentration upon practically one portion of the succeeding surface or at least without reference to the semiclassified state of the particles thus transferred as produced and existing upon the surface from which they were delivered, in consequence of which the process of concentration of the different materials has to practically start anew and redevelop over each succeeding surface. The work of separation actually in existence on the preceding surface is lost, and the work of concentration is not advanced, but retarded. It is also evident that in the type of concentrator wherein a single table comprises several shelves over which desired portions of the material pass successively, each shelf being rigidly fixed as a part of such table and its relation to the other shelves being fixed and the entire table being reciprocated and adjusted to longitudinal and lateral inclination as an entirety, the material following from shelf to shelf is subjected only to relatively differing conditions of surface inclination and precisely the same condition as to reciprocating motion on each succeeding shelf. As the inclination of the surface and its motion are each functional in the separation process, a valuable opportunity for supplying a slight difference in adjustment of these factors on succeeding shelves to make the separation operation more effective is lost. Again, considering the type of concentrator where the process of concentration is carried on and finished on one surface a relatively broad surface is required. The material proceeds to discharge, being directed by the lateral and longitudinal adjustment of the surface, so that the "line of separation" of the "concentrates" and "waste" is brought to a "parting-point" at the corner of the table diagonally opposite the feed. The parting of concentrates and waste is also made by the use of a sliding compartment within launders placed to receive the material from the entire discharge periphery of the table and by other methods. Whatever the device used it involves directing the line of separation to a parting-point. The position of the line of separation on the surface is influenced by the quality or quantity of the feed, the regulation of the wash-water, the character of the reciprocating motion, and the inclination of the table. The slightest variation of one of these factors will tend to slightly vary the position of the line of separation on the table, and thus vary the proportion of concentrates and waste. A relatively broad table exaggerates the variation of movement of the line of parting over its surface in comparison with a narrow table or tray. Hence there is a greater tendency in using a broad table to the formation of "middlings" or to a confusion of the products of concentrates and waste than in using a relatively narrow surface, where the position of the line of separation is more readily controlled.

My object is to materially increase the capacity and efficiency of the foregoing types of ore-concentrators as heretofore used and secure better results than have before been possible, as well as to provide a construction adapted for using separate light narrow concentrating-surfaces, whereby the process is not only carried on effectively, but the several parts themselves constitute a lighter less cumbersome machine to handle and less expensive machine to manufacture than concentrators of the above-mentioned types.

One of the objects of the present invention is to provide a plurality of separate concentrating-surfaces adapted to take the pulp in succession one from another and arranged for independent reciprocating motion, independent lateral and longitudinal adjustments, and independent water-supply, whereby the tendency of the combined action of the reciprocating motion and the wash-water on particles of ore introduced upon each concentrating-surface is to produce a more or less regular classification of such particles moving along approximately definite lines and ultimately discharging from said surface, the concentrated particles discharging from one portion of each concentrating-surface and the other more or less classified particles discharging from other portions of the said surface in the form of a pulp and means of delivering desirable portions of such more or less classified particles of pulp discharging from one concentrating-surface to a succeeding concentrating-surface in such manner as to preserve to the initial action of the succeeding concentrating-surface the particles of pulp in substantially the form of classification produced by the action of the preceding concentrating-surface—that is, substantially unmixed—and continue such process progressively over the series of concentracing-surfaces to the last of such concentrating-surfaces and discharge therefrom all the particles of pulp remaining.

In connection with the novel ore-concentrator I have devised, embracing, as it does, separate or independent concentrating-surfaces. My object is to provide means whereby each concentrating-surface may be readily adjusted independently of the other surfaces for its desired vertical elevation and inclination and its lateral inclination, and a further object is to make provision for shaking or reciprocating the separate concentrating-surfaces as an entirety, each independent of the other surfaces, and I have found it desirable to provide a novel mechanism whereby each concentrating-surface can be given desired rates of reciprocation or movement. By means of the lateral and longitudinal adjustment of each surface and means whereby the reciprocation of each surface may be varied the particles that have failed to completely classify and separate as concentrates may be subjected to slightly-changed conditions on passing to a succeeding surface, thereby bringing about the desired separation.

In connection with the present invention for delivering the more or less classified arrangement of pulp particles existing on one concentrating-surface in substantially the same form to the initial action of a succeeding concentrating-surface I have found it advantageous to employ means to relieve the pulp passing from one concentrating-surface to the succeeding concentrating-surface of a quantity of its wash-water, so that it will be presented in a drier state to the action of the succeeding concentrating-surface, as also to utilize on the succeeding concentrating-surface the extracted portion of the wash-water, and with this end in view my object is to provide a novel arrangement which will accomplish the desired results. It is understood that the office of a screen used as described is to take off a superfluity of water forming part of the pulp passing over it and not to essentially disturb the arrangement of classification being delivered thereon.

To the end that the invention accomplishes the foregoing objects and others not specifically mentioned, I provide a plurality of separate or independent concentrating surfaces or trays, improved means for shaking or reciprocating said surfaces or trays independently and for adjusting each one of them independently to desired heights and longitudinal and lateral inclinations, and novel means for delivering the desired portions of the particles of pulp from one concentrating-surface to the succeeding concentrating-surface in such manner as to preserve to the initial and progressive action of the succeeding concentrating-surface the pulp in substantially the form of classification of particles as produced by the action of the preceding concentrating-surface, means for relieving the pulp so passing from one concentrating-surface to a succeeding concentrating-surface of a desired quantity of its wash-water, and means adapted for distributing the water so extracted for use as wash-water on a succeeding surface, as fully described hereinafter, while the novel features, relations, and adaptations of parts are recited in the claims hereto appended.

In the accompanying drawings, Fig. 17, a detail view looking in the direction of the arrow of Fig. 14 toward the slotted plate. Fig. 18 is a detail view of the combined chute and screen and the trough of Figs. 10 and 11, and Figs. 19 and 20 detail views showing how the screen of Figs. 8 and 9 can be connected to the concentrating-trays.

Figures 1, 4, 5, 6, 7:
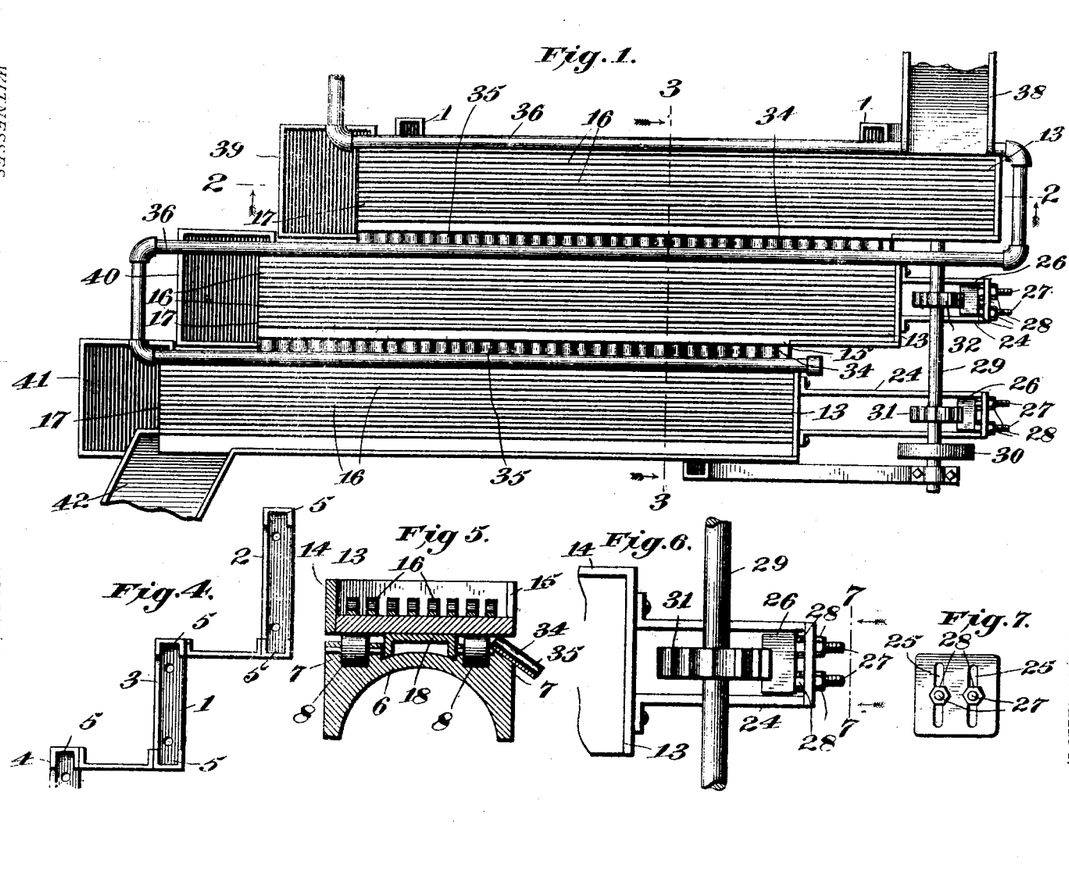
Figure 1 is a plan view illustrating one form the invention may assume.
Fig. 4, a detail view illustrating the stepped or staggered construction of the machine-frame at one end.
Fig. 5, an enlarged cross-section of one of the concentrating surfaces or trays and the bed on which it rests.
Fig. 6, a detail of the means shown in Fig. 1 for reciprocating the concentrating surfaces or trays.
Fig. 7, a detail view looking toward line 7 7 of Fig. 6.

Referring now more particularly to Figs. 1 to 7, inclusive, the numeral 1 designates the frame of the machine, which will be of such mechanical design as to be as light and strong as possible and adapted to be well braced to withstand the reciprocating motion. On account of the staggered arrangement of the separate or independent concentrating surfaces or trays—that is, each succeeding tray extending in advance of the preceding tray—the ends of the frame 1 are arranged as shown in Fig. 4, the different panels 2, 3, and 4 being located one in advance of the other and having guides 5 and braces 58.

The construction of each concentrating-tray, its bed, and adjusting means being similar in all respects to the others of the series, only one will be described. The bed consists of an arched portion 6 and two or more pairs of upright wings 7, antifriction-rollers 8 being journaled in the wings, while the entire bed is supported by cross-bars 9, having their ends 10 movable vertically in the guides 5 of the frame 1. Threaded through cross-webs 11 of the frame 1 are vertical adjusting-screws 12, which support the cross-bar 9 near its ends. I find it desirable to employ an adjusting mechanism such as described at both ends of the frame 1. The concentrating-tray is shown at 13, being provided with wall 14 at one side and open at its opposite side 15, while riffles 16 run longitudinally of the tray from the receiving to the concentrates-discharge end 17 thereof and are of greatest height at the receiving end and taper gradually to the concentrates-discharge end 17. The concentrating-tray rests on the antifriction-rollers 8 and has secured thereto a bar 18, which lies between the wings 7 and prevents lateral displacement of the tray while reciprocating. The tray is preferably provided with a stop or abutment 19 to engage a block 20, made adjustable by clamping-screw 21, whose shank moves in a slot 22 in the bed 6. (See Fig. 2.) When not limited by the kicking or reciprocating mechanism itself, (described hereinafter,) this stop or abutment can be adjusted to arrest the tray in its movement toward the concentrates-discharge end thereof, and adjustment can be had to limit the reciprocation as desired. A coil-spring 23 is secured to the frame at one end and to the tray 13 at its other end and serves to sharply retract the tray when released by the reciprocating mechanism.

It will be seen that the adjusting-screws 12 constitute means whereby the bed can be raised or lowered to the desired extent at one or both ends and also tilted or inclined laterally, and in consequence of the tray resting on the rollers provided on the bed the tray will maintain the same angle of adjustment to which the bed may be brought without interfering with the reciprocation of the tray, which is independent of the bed so far as its reciprocation is concerned. Provision is thus made whereby the machine can be adapted to the condition of the material passing thereover and other requirements at the time of use.

In the present instance I have illustrated three concentrating-trays, this practice being found to be of advantage in ore concentration. These trays are provided with stirrups or yokes 24, whose end plates have vertical slots 25. The numeral 26 designates a bumping-block to which are connected screws 27, passing through the slots 25, while nuts 28 serve to clamp the screws wherever adjusted vertically in the slots. The slot-openings 25 are constructed of sufficient width, considering the screws 27, to allow sufficient tilt of the tray laterally and still maintain the proper horizontal contact relation between the cam-toothed wheel and the bumping-block. Provision is thus made to compensate for the different vertical and lateral adjustments of the trays by the screws 12. A power-shaft is shown at 29 as provided with a drive-pulley 30 and carrying toothed cam-wheels 31, 32, and 33 for the respective trays. The cam-toothed wheels coact with the edges of the bumping-blocks, so that as the shaft rotates the trays are all pushed to the right by reason of the cam-inclines wiping against the bumping-blocks, after which the bumping-blocks are abruptly released on reaching the abrupt shoulders of the cam-toothed wheels, and the concentrating-trays are then sharply and abruptly pulled to the left. This operation continues as long as the shaft 29 is in rotation.

Figure 3:
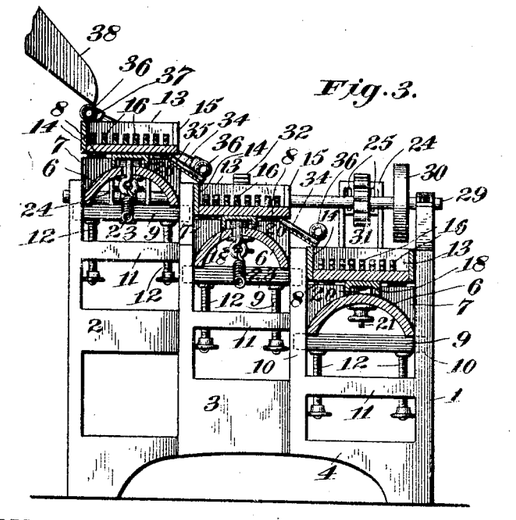
Fig. 3, a transverse section on line 3 3 of Fig. 1.

The separate or independent concentrating-trays, as shown in Figs. 1 and 3, are arranged as a series of descending levels, with each succeeding tray located in advance of the preceding tray, considered longitudinally of the trays. To accomplish the delivery of the pulp from a higher to a lower tray of the series, I provide the chutes or inclines 34, one of which is located between adjacent trays, being secured to the bed 6 and extending underneath the upper tray and overhanging the side 14 of the tray below. These chutes, as shown in Figs. 1, 3, and 5, are imperforate and provided with transverse corrugations 35 and extend from the concentrates-discharge end of the higher tray toward the head of the lower tray, whereby they are adapted to deliver all of the concentrated pulp from the higher tray to the tray next below it.

The numerals 36 designate portions of a wash-water-supply pipe and have the perforations 37. These branches of the pipe extend the full length of the trays and are located immediately over the lower edges of the chutes 34, and the water issuing from said branches of the pipe is directed in a general transverse crosswise or lateral direction in relation to the concentrating-trays and longitudinal riffles thereon.

At 38 is shown the feed-chute for delivering the material, usually in the form of a pulp, to the head or upper end of the highest concentrating-tray, while 39, 40, and 41 represent boxes located at the concentrates-discharge end of the respective trays and adapted to receive the concentrated material from said trays. The numeral 42 designates a chute or spout for taking off the tailings from the foot of the lowest concentrating-surface.

Figure 2:
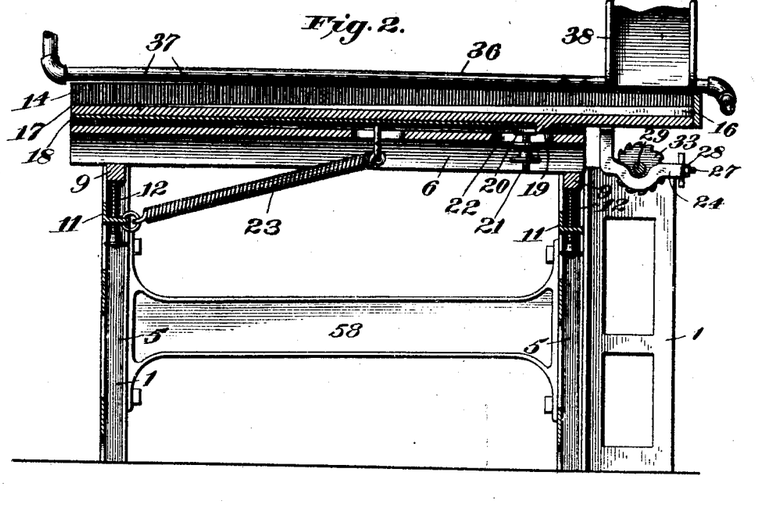
Fig. 2, a longitudinal section on line 2 2 of Fig. 1.

In the embodiment of the invention as described the material is fed from the chute 38 onto the head of the upper concentrating-tray and subjected to the shaking motion of that tray, and thereby carried across its surface with a tendency to move the particles between the riffles and in a direction toward the concentrates-discharge end of the surface; but the wash-water issuing from the perforations in the branch 36 of the pipe carries the relatively lighter particles across the riffles to discharge off of another portion of the surface. The wash-water is supplied in different quantities, as by different-sized discharge-openings in the pipe 36, as shown in Fig. 2, along the line of the riffles and transversely thereof and less toward the concentrates-discharge end, where the riffles are shallow, than where they are deeper. Thus the relatively lighter particles are washed in a transverse direction by a heavy flow of water at the feed end, where the riffles are high, and the relatively heavier particles are protected and permitted to proceed in the direction of the concentrates discharge. The general direction of the movement of the pulp is controlled by the lateral and longitudinal adjustment of the said surfaces. The material tends to arrangement of classification, according to the physical character of the particles, as they proceed over the concentrating-surface, and the result is that the action of the concentrating-surface when properly regulated as to its lateral inclination discharges the concentrates off of the end portion of the surface and into the box 39, while the balance of the pulp moves to discharge in a more or less regular form of classification, its particles forming along approximately definite lines, and flows onto the chute 34, which delivers such more or less classified form of pulp particles to the initial action of the next lower concentrating-tray in substantially the same arrangement of its particles as existed on the tray from which it passed—that is, substantially unmixed. By reason of the fact that the second concentrating-surface is arranged in advance, considered longitudinally, of the first surface the independent shaking or reciprocating action of the second concentrating-surface will cause a repetition of the action of the first surface, but with this difference—namely, the pulp will be delivered to the second concentrating-surface in a more or less classified state of its particles, forming along approximately regular lines already existing and defined, so that the second surface does not have to effect the classification of the material initially—that is to say, the pulp is not again mixed—and the process of separation on the second surface is thus carried on much more speedily and effectively than would be the case if all of the unconcentrated material discharged from the first surface were delivered in a mixed condition for the further action. Again, the succeeding surface to which the pulp is delivered is adapted for independent movement, regulation of wash-water, and lateral and longitudinal inclination, whereby slightly-varying adjustments of these factors may be brought to bear upon the particles which have failed to arrange themselves as concentrates on the preceding surface and the precise conditions supplied for favoring proper separation. Thus each surface does not only not have to effect the classification initially; but as the pulp proceeds in a more or less classified state from one surface to the next it is not subjected to identically the same motion or relatively the same inclination of surface as it met with on the preceding surface. In the continuance of this classification process progressively over a series of surfaces adapted to independent adjustment exists a fundamental and very important difference in my invention over constructions heretofore known to the art in this type of concentrating-machine. The operation on the second tray is, with the aforenamed differences concerning the initial classification and the independent action of each surface, similar to the action of the first concentrating-tray, the concentrates passing off the discharge end of the tray and the unconcentrated material passing onto the second chute 34, and thence to the third and last concentrating-tray, on which the pulp is delivered in the same manner as delivered from the first to the second tray and the concentrates discharged therefrom as before, while the waste is led off by the chute 42. Such a provision of independent or separate concentrating-surfaces and means for delivering desired portions of the classification of particles as produced on one concentrating-surface for its progressive continuance of classification on a separate succeeding concentrating-surface results in independent action by each concentrating-surface on the particles embraced in the classification passing thereover which gives a material increase of the efficiency of the machine and also allows the employment of narrow concentrating-surfaces, whereby the factors regulating the action of the material over the surfaces may be readily and effectively controlled and over which a great quantity of material may be effectively operated.

Figure 8:
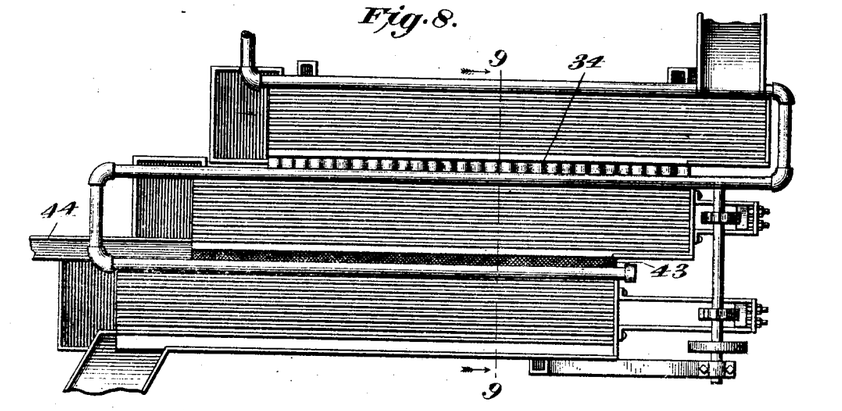
Fig. 8, a plan view illustrating the use of a fine-mesh screen in place of the delivery device from one tray to a succeeding tray shown in Figs. 1, 3, and 5.
Figure 9:
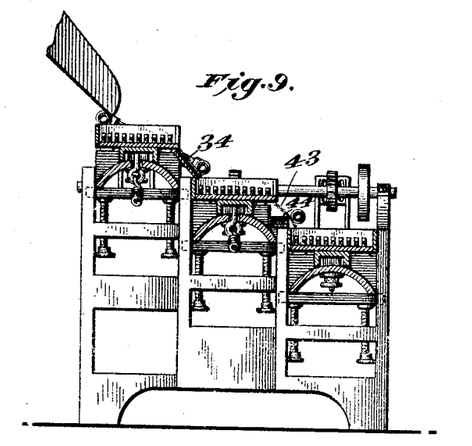
Fig. 9, a transverse section looking toward line 9 9 of Fig. 8, illustrating the trough or box underneath the screen.
Figures 17, 18, 19, 20:
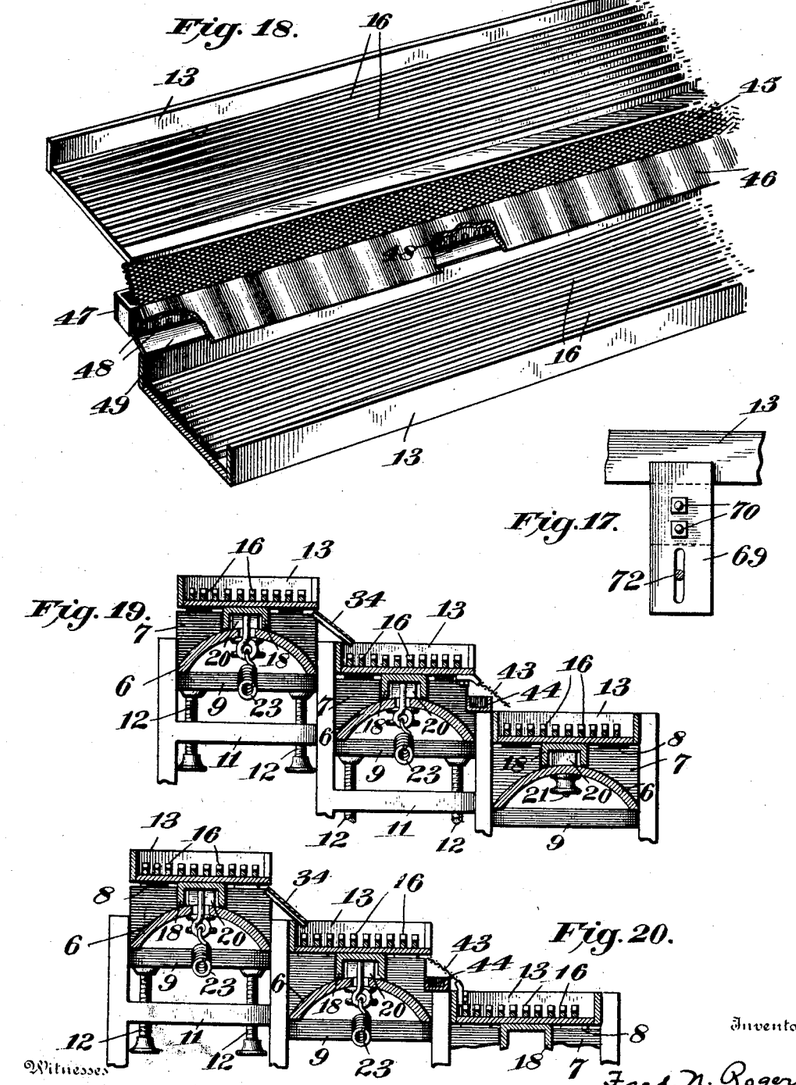

In some instances it will be found that it is desirable to relieve the pulp passing from one surface to a succeeding surface of a certain amount of water, as wash-water is added to the pulp on each succeeding tray, and the addition of a cross-feed or wash of water is not so effective on a superfluid pulp as it is on a drier pulp. I therefore sometimes prefer to substitute for the chute 34, which is imperforate, a screen of fine mesh between two of a series of concentrating-trays, as shown in Figs. 8 and 9. Here the screen is shown at 43 arranged in the same manner as the chute 34 of Figs. 1, 3, and 5, and the screen will carry the pulp from one tray to the succeeding tray and preserve the classification of the particles, as heretofore described, while the excess of wash-water will pass through the screen and be received in a sluice or box 44, from which it may be allowed to pass or may be taken and used over again as wash-water in any preferred manner. If preferred, this screen may be firmly attached to one of the reciprocating surfaces, as shown in Figs. 19 and 20, which added motion will aid the process of screening by keeping the meshes of the screen open. Herein lies a very important and novel feature of my invention, since a pulp when in a superfluid state is not effectively operated by introducing it to a cross flow of more water. I have further provided a novel feature by utilizing the water extracted at one point for washing purposes upon a succeeding surface, thereby not only contributing to an economy of water often essential in concentrating operations, but confining the use of wash-water to the same water used again and again before "wasting," and thus causing less losses by "sliming" where "fresh" water would be introduced to wash away the light particles.

Figure 10:
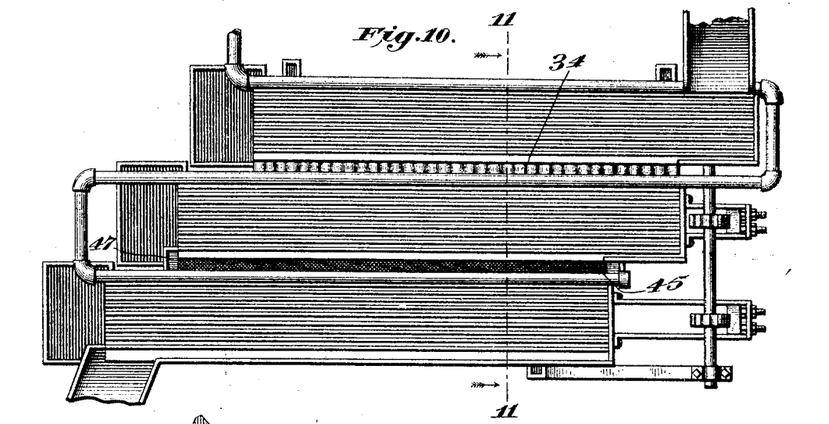
Fig. 10, a plan view of the form employing a delivery device partly screen and partly imperforate.
Figure 11:
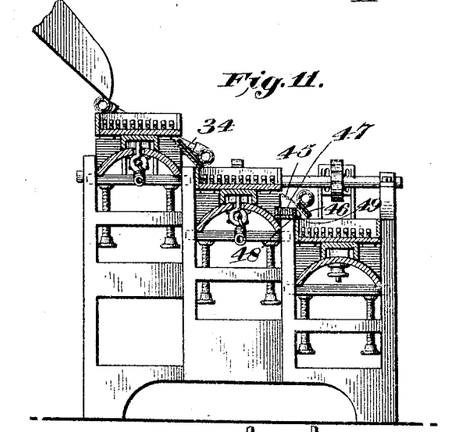
Fig. 11, a transverse section looking toward line 11 11 of Fig. 10.

In Figs. 10 and 11 I have illustrated another embodiment of the idea shown in Figs. 8 and 9. In Figs. 10 and 11 the chute corresponding to chute 34 of Figs. 1, 3, and 5 has its upper portion for its entire length composed of a screen 45, while its lower half or portion 46 is imperforate and of the form assumed by the chute 34. Underneath the screen is a trough 47 to receive the excess of water from the pulp passing over the screen 45, and this trough is provided with perforations 48 and an imperforate ledge or chute 49, adapted to deliver the water onto the next lower tray. The excess of water flowing into the trough 47 from the screen 45 passes through the perforations 48 and down the incline 49 onto the next lower tray and constitutes wash-water for that tray. Thus while relieving the pulp of the excess of its fluid and enabling it to be delivered to the next lower tray in a drier and thicker condition the water is not lost, but, on the contrary, effectively used on the lower tray.

In the claims in referring to "means," a "chute or incline," or expressions of similar import I desire to be understood as including, if desired, the construction illustrated in Figs. 8, 9, 10, 11 under any such broad language used, because while having an additional function—i. e., relieving the pulp of excess water—the screen is adapted to deliver the pulp as classified on the preceding surface to the initial action of the succeeding surface.

Figure 12:
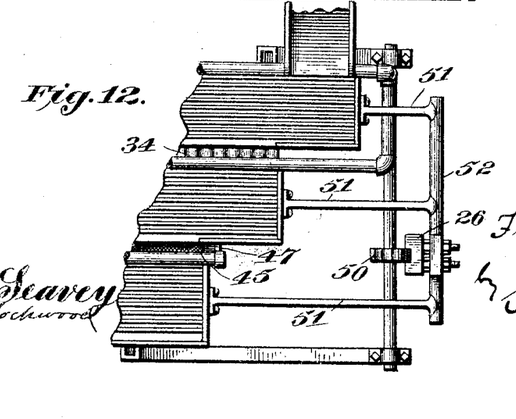
Fig. 12, a plan detail view illustrating a modification of the reciprocating means whereby independently-adjustable concentrating-surfaces are reciprocated together from one source.

In Fig. 12 I illustrate a modification wherein all of the trays or surfaces, each of which is independently adjustable to lateral inclination, as more particularly shown in Figs. 1 to 7, may be operated together from one source of reciprocation, in this instance a cam-toothed wheel. Here the surfaces have rods or bars 51 extending from each of them and connected by a cross-bar 52, equipped with an adjustable bumping-block 26.

Figure 14:
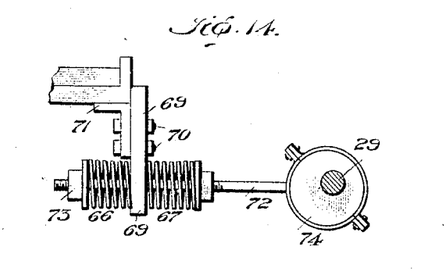
Fig. 14, a modified detail of the reciprocating means showing the manner in which an eccentric working through springs may be used to reciprocate each of the three concentrating surfaces or trays independently of the others, the three eccentrics being rotated by the same shaft.

In Fig. 14 I illustrate a way in which each of the independently-adjustable trays or tables may be reciprocated by means of an eccentric working through two springs of different strengths. The eccentric 74 is rotated by means of shaft 29. The eccentric-rod 72 extends through an opening in the plate 69, which plate is bolted to bracket 71 by means of bolts 70, and which bracket is fixed rigidly to the tray. The bolt-holes in plate 69 are slotted in order to allow a vertical adjustment of the tray with relation to the eccentric. Coiled springs 66 and 67 of different strengths are placed one on each side of the plate 69, with the rod 72 extending through them. Thus the tray is reciprocated by means of the eccentric working through the two springs 66 and 67. The character of the motion is regulated by the relative tension of the springs made adjustable by nuts 73. When properly adjusted, this gives each tray an independent "quick-return" motion, which is effective in causing the ore particles to travel thereover. This method of reciprocation does not require the use of stops to regulate the throw of the tray.

Figure 15:
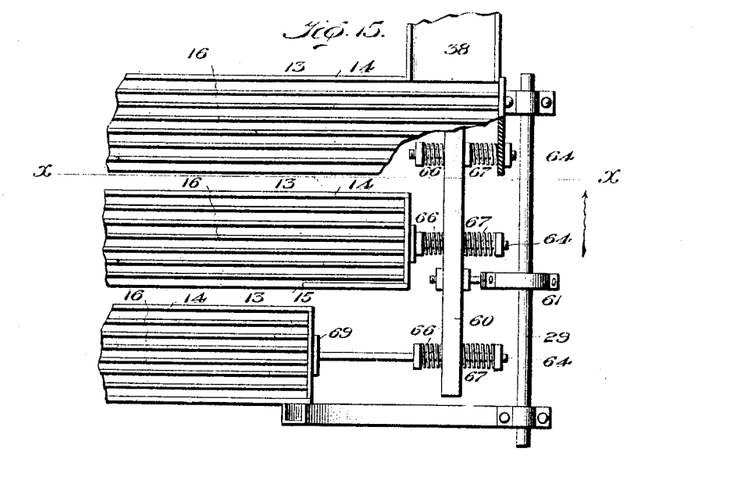
Fig. 15, a plan detail view illustrating a modified means of reciprocation whereby each of the concentrating-surfaces have independently-adjustable motions, although all are reciprocated from one source.
Figure 16:
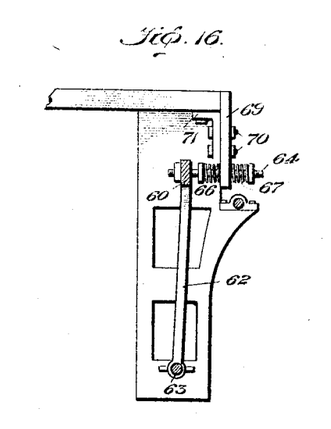
Fig. 16, a transverse section of Fig. 15 looking toward the line $x$ $x$.

Figs. 15 and 16 illustrate a method by which the three independently-adjustable trays are reciprocated by one rotating means instead of three, and still all three trays have independently-adjustable motions. The eccentric 61, rotated by shaft 29, reciprocates the cross-bar 60. The cross-bar is supported by rocking arms 62, which are provided with suitable bearings, as at 63. Each of the three trays is connected to the cross-bar by means of rods 64, which are fixed to the tray by means of plate 69, bolts 70, and brackets 71, as similarly shown in Fig. 14, to allow a vertical adjustment of the tray with relation to the cross-bar. Coiled springs 66 and 67 are placed one on each side of the cross-bar, the rod 64 extending through the coiled springs. The springs are of different strengths, and their tensions are regulated by means of nuts on the rods 64. The trays are thus each adapted to an independently-regulated reciprocating motion, although the one eccentric reciprocates the three trays. As explained before, this motion is of "quick-return" character, adapted to cause the ore to travel upon the tray.

Figure 13:
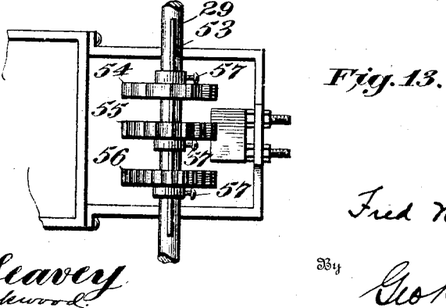
Fig. 13, a detail view illustrating a modification of the reciprocating means of Figs. 1, 2, 3, and 6, whereby the rates of reciprocation of movement of each concentrating-tray can be varied.

In Fig. 13 there is shown a modification illustrating how each surface may have provision make for shaking or reciprocating it at different speeds or rates of vibration. Here the shaft 29 is provided with three feathers or splines 53, on each of which is a set of, say, three cam-toothed wheels 54, 55, and 56, having different numbers of teeth, the same being slidable on the feather or spline longitudinally of the shaft and independently of each other and always adapted to turn with the shaft and being held against longitudinal movement when desired by set-screws 57. Any one of the three cam-toothed wheels can be brought into alinement with the bumping-block on a given surface, and hence with a given number of revolutions of the shaft 29 it will be possible to obtain different rates of reciprocation, as desired, of any surface independently of any other surface—that is to say, provision is made for giving each surface any one of three different rates of vibration without regard to the rate of vibration of either of the other surfaces. This arrangement for progressive concentration over successive surfaces requires the separate surfaces to be of the "classifying" type exhibited in the form of concentration-surface, which when subjected to rapid shaking percussive displacement or analogous movement cause displacement of the pulp thereon by successive shocks or impulses, thereby influencing the individual particles to a rolling motion over the said surface. By virtue of these movements and an additional washing action particles or groups of particles of like "physical character" tend to follow the same paths of travel, and a more or less regular classification of the pulp is thereby effected. The paths of travel of the particles or groups of particles diverge slightly in direction, according to the physical character of the slightly-differing classes of particles or groups of particles. As hereinafter explained, the predominating factor of the physical character upon which the classification depends is that of the specific gravity of the particles. The operation on each surface is manipulated with reference to the more perfect classification of the "headings," which are separated as "concentrates," and the basis of novelty herein is the arrangement of successive surfaces and means of progressing desired portions of the less-perfectly classified material from one surface to a succeeding surface without substantially intermingling or disturbing its existing state of classification.

This process accomplishes effective results in its successive steps by the separation and removal of desired portions of the pulp on each surface, thereby permitting the more or less classified pulp delivered to the succeeding surface greater freedom in separating action. This is explained by the fact that the particles or group of particles removed as concentrates at each step are specifically heavier, and by removing these heavy "heads" the more or less classified material delivered with especial reference to existing arrangement of its particles or groups of particles is also relieved of a restraining influence and the particles have greater freedom to classify under the set of separating actions on the succeeding concentrating-surface.

Results are obtained that would be impossible without removing these specifically-heavier particles from step to step of the process, and results are also obtained which would be impossible to obtain without having had the load or restraining influence of the heavier particles during a previous operation, and results are attained which would be impossible to obtain by mixing the material in arrangement of particles between any two surfaces, thus requiring an entirely new development of diverging lines of separation upon the succeeding surface.

The mechanical actions of the successive surfaces are manipulated to best suit the character and existing state of the more or less classified material delivered to it. Each surface is controlled by various adaptations of motion to regulate the movements of the particles thereover, and by degree of inclination, arrangement of guides or riffles, density, volume, and disposition of the washing medium, which regulate the washing action thereon. It is also obvious that an arrangement for successive operations of concentration over that type of machine which has a feed disposed at right angles to its motion and delivers its concentrates at one end of the surface and tailings at the other end does not carry on a progressive concentration action, such as herein described, for the reason that neither concentrates nor tailings portions which may be delivered for successive action exist in any regular order of classification from point to point, but each of said portions is delivered in a mixed mass of particles. It is also evident that a single rotating surface or a single traveling belt, each a type of concentrator carrying the particles (not producing a movement upon them) through a routine of travel, subject to different currents of wash-water or perhaps different degrees of vertical jigging agitation, are types of machines which do not anticipate any such arrangement of progressive concentration as is herein described.

With reference to the term "physical character" used herein if the pulp particles operated were all of absolutely the same size and each individual particle consisting of but a single mineral element the constituent particles consisting of different mineral elements then, under the action described, the constituent particles would ultimately follow divergent paths of travel and develop into a regular classification varying uniformly from particle to particle, according to the specific gravity of the particles. In practice a pulp mass is heterogeneous in character. Absolute sizing is impracticable; but few of the particles are entirely of a single mineral element, individual particles often being composed of several distinct elements, in fact, microscopic particles often being composed of as many different elements as the ore contains, and each of these elements varying widely in specific gravity. Again, in practice a pulp is often operated consisting of a small quantity of particles of relatively high specific gravity and a small quantity of relatively low specific gravity, the remaining and large portion of the bulk consisting of particles of mineral and of mineral combinations varying but slightly in specific gravity from each other, but varying considerably in specific gravity from each of the other constituent portions of the pulp, a pulp with an excess of natural "middlings" and a small proportion of "heads" and a small proportion of "tails." In practice the lines of separation often develop a characteristic banded structure, due in some instances to the predominance of particles of a certain size and kind and in some instances to the predominance of particles of a similar composite nature. The predominance of particles as mentioned are characteristics due to the comminution of the ore when previously preparing it for the process of concentration. Hence because in practice a pulp is necessarily of a heterogeneous character and the mechanical action of a concentrator is more or less crude in handling particles varying but infinitesimally in character, the term "physical character" (which involves size and predominance of mineral particles of the same kind) is considered as more properly describing the character of classification than a strict limitation to the use of the term "specific gravity," which, however, is the dominant factor producing the classification.

I am aware that a staggered arrangement of the surfaces, such as shown in Fig. 1, and the utilization of the specific form of means for conveying the classification of one surface to the initial action of the succeeding surface, such as shown and described, are not the only means that may be employed for accomplishing the delivery of the classification from one surface to a succeeding surface, and I do not, therefore, desire to be understood as limiting myself to the precise construction shown and described in this connection, and I am also aware that other features of the invention can be varied in different particulars and the same results accomplished. I do not therefore limit myself to the precise constructions herein shown and described, but consider that I am entitled to all such modifications and variations as fall fairly within the spirit and scope of my invention.

The essence of my invention being the delivery of partially-classified pulp from one concentrating-surface to another adapted to have a different adjustment of classifying movement without substantially disturbing the classification already attained, the particular manner of transferring from one table to another is not essential, so long as the purpose is attained of substantially preserving the preceding classification. Therefore I desire not to be understood as restricting myself to the specific means or manner of transfer herein set forth and wish to be understood as claiming any equivalent means which attains the purpose.

By the use of the words "shaking" or "impulses" in the claims as having reference to the substantially horizontal motion imparted to the concentrating-surfaces I have in mind the inclusion of all the species of motions known to the art which would accomplish a classifying movement of the pulp particles over the concentrating-surfaces.

Having thus described my invention, what I claim as new, and desire to secure by Letters Patent, is—

1. In an ore-concentrator, the combination with a plurality of independent classifying concentrating surfaces arranged for progressive concentration, of means for independently shaking the respective concentrating-surfaces to impart classifying movement to the pulp particles, and a conveyer adapted to convey and deliver desired portions of the more or less classified pulp in a sheet from one concentrating-surface, without substantially intermingling or disturbing the existing classification thereof, to a succeeding concentrating-surface, thereby effecting a progressive concentration over the successive concentrating-surfaces.

2. In an ore-concentrator, the combination with independent classifying concentrating-surfaces arranged for progressive concentration, of means for independently shaking the respective concentrating-surfaces to impart classifying movement to the pulp particles, and a single continuous chute adapted to convey and deliver the entire continuous sheet of more or less classified pulp from one concentrating-surface, without substantially intermingling or disturbing the existing classification thereof, to a succeeding concentrating-surface, thereby effecting a progressive concentration over the successive concentrating-surfaces.

3. In an ore-concentrator, the combination with independent classifying concentrating-surfaces arranged for progressive concentration, of means for imparting impulses to the respective concentrating-surfaces independently of each other to impart classifying movement to the pulp particles, means for taking off desired portions of the discharge of the more or less classified pulp at every point of discharge thereof in a continuous sheet from one concentrating-surface and adapted to deliver all of said portions of the pulp, without substantial intermingling of the existing classification thereof, to a succeeding concentrating-surface so that the points of delivery onto a succeeding concentrating-surface are relatively farther from the termination of the concentration action on that surface than the points of discharge from the preceding concentrating-surface are from the termination of the concentration action on that surface, thereby effecting a progressive concentration over the successive concentrating-surfaces.

4. In an ore-concentrator, the combination with independent classifying concentrating-surfaces arranged for progressive concentration, of means for imparting impulses to the respective concentrating-surfaces, at different speeds independently of each other to impart classifying movement to the pulp particles, and means adapted to deliver desired portions of the more or less classified pulp from one concentrating-surface, without substantially intermingling or disturbing the existing classification thereof, to a succeeding concentrating-surface, thereby effecting a progressive concentration over the successive concentrating-surfaces.

5. In an ore-concentrator, the combination with a plurality of concentrating-surfaces arranged in staggered relation, that is, one in advance of the other relative to the direction of their movement, of means for imparting impulses to the respective concentrating-surfaces independently of each other to impart classifying movement to the pulp particles, means for washing said surfaces in an angular direction to their motion, and means for delivering desired portions of the more or less classified pulp in a sheet, without substantial intermingling thereof, from one concentrating-surface to a succeeding concentrating-surface nearer the head of the succeeding concentrating-surface than the corresponding points of delivery from the preceding concentrating-surface.

6. In an ore-concentrator, the combination with a plurality of concentrating-surfaces each adapted for independent action as an entirety, of means for reciprocating said surfaces, means for directing wash-water over said surfaces, a chute or incline having a screen and positioned to receive desired portions of the more or less classified particles of pulp discharging from a preceding surface and deliver them substantially as received to the receiving portions of a succeeding concentrating-surface, without substantial intermingling.

7. In an ore-concentrator, the combination with a plurality of separate concentrating-surfaces each adapted for independent action as an entirety, and arranged in staggered relation, that is, one in advance of the other relative to the direction of their reciprocation, of means for reciprocating said concentrating-surfaces, means for directing wash-water over said surfaces, chutes or inclines having screens arranged and adapted to receive desired portions of such more or less classified particles of pulp discharging from the preceding surface and deliver them upon a succeeding concentrating-surface, that is, without substantial intermingling and a trough or sluice located under the screen and adapted to receive the water passing through the screen as the pulp passes thereover.

8. In an ore-concentrator, the combination with a plurality of concentrating-surfaces each adapted for independent action as an entirety, of means for reciprocating said surfaces, means for directing wash-water over said surfaces, chutes or inclines arranged and adapted to receive desired portions of such more or less classified particles of pulp as discharging from a preceding surface and deliver them substantially as received to the receiving portions of a succeeding concentrating-surface, that is, without substantial intermingling, one of the lower of said chutes or inclines having a screen adapted to sieve off a portion of the water forming part of the pulp passing thereover.

9. In an ore-concentrator, the combination with a plurality of concentrating-surfaces each adapted for independent action as an entirety, of means for reciprocating said surfaces, means for directing wash-water over said surfaces, chutes or inclines having screens and arranged and adapted to receive desired portions of such more or less classified particles of pulp as discharging from the preceding surface and deliver them substantially as received to the receiving portions of a succeeding concentrating-surface, without substantial intermingling, and means for receiving the water sieved off by the screens and delivering it as wash-water on the succeeding concentrating-surface.

10. In an ore-concentrator, the combination with a plurality of concentrating-surfaces each adapted for independent action as an entirety, of means for reciprocating said surfaces, means for directing wash-water over said surfaces, a chute or incline composed partly of a screen and partly of an imperforate portion and arranged and adapted to receive desired portions of such more or less classified particles of pulp as discharging from the preceding surface and deliver them substantially as received to the receiving portions of a succeeding concentrating-surface, that is, without substantial intermingling, a trough located under the screen portion of the chute or incline and adapted to receive the water passing through the screen, and an incline or chute leading from said trough and adapted to deliver the water therein onto the succeeding concentrating-surface to serve as wash-water thereon.

11. In an ore-concentrator, the combination with a plurality of separate concentrating-surfaces each adapted for independent action as an entirety, and means for delivering desired portions of the more or less classified pulp in a sheet directly from one concentrating-surface to a succeeding concentrating-surface, whereby intermingling of the previous classification is prevented, of means for reciprocating said concentrating-surfaces independently of each other, and means for adjusting the concentrating-surfaces up and down independently of each other.

12. In an ore-concentrator, the combination with a plurality of separate concentrating-surfaces each adapted for independent action as an entirety, and means for delivering desired portions of the more or less classified pulp in a sheet directly from one concentrating-surface to a succeeding concentrating-surface, whereby intermingling of the previous classification is prevented, of means for adjusting the said concentrating-surfaces up and down independently of each other, means for reciprocating said concentrating-surfaces independently of each other, and adjustable devices whereby said reciprocating means can be made to coact with the concentrating-surfaces regardless of the position to which said concentrating-surfaces are adjusted.

13. In an ore-concentrator, the combination with a plurality of separate concentrating-surfaces each adapted for independent action as an entirety, and means for delivering desired portions of the more or less classified pulp in a sheet directly from one concentrating-surface to a succeeding concentrating-surface, whereby intermingling of the previous classification is prevented, of means for adjusting said concentrating-surfaces to different heights and also to different angles of inclination both longitudinally and laterally.

14. In an ore-concentrator, the combination with a plurality of separate concentrating-surfaces each adapted for independent action as an entirety, and means for delivering desired portions of the more or less classified pulp in a sheet directly from one concentrating-surface to a succeeding concentrating-surface, whereby intermingling of the previous classification is prevented, of elevating-screws located substantially at the four corners thereof whereby the concentrating-surfaces can be adjusted to different heights and also to different angles of inclination both longitudinally and laterally.

15. In an ore-concentrator, the combination with the machine-frame having upright guides, of a bed having vertical wings arranged in pairs and separated from each other, cross-bars sustaining the bed and movable in the guides, elevating-screws in the machine-frame which sustain the cross-bars, rollers journaled in the bed, a reciprocatable concentrating table or tray resting on the rollers aforesaid, and a guide on the table or shelf which moves between the wings aforesaid, said parts being so disposed and related that adjustment of the bed insures adjustment of the table and lateral displacement of the table from the bed is prevented.

16. In an ore-concentrator, the combination with a plurality of independent classifying concentrating-surfaces arranged for progressive concentration, of means for washing said surfaces in an angular direction to their motion, means for independently shaking the respective concentrating-surfaces to impart classifying movement to the pulp particles, and means for delivering desired portions of the more or less classified pulp without substantial intermingling thereof from one concentrating-surface to points on a succeeding concentrating-surface relatively farther from the termination of the concentration action on that surface than the places of discharge from the preceding surface are from the termination of the concentration action on that surface.

17. In an ore-concentrator, the combination with a plurality of independent classifying concentrating-surfaces, of means for imparting impulses to the respective concentrating-surfaces independently of each other to impart classifying movement to the pulp particles, and means adapted to deliver desired portions of the more or less classified pulp from one concentrating-surface to a succeeding concentrating-surface without substantially intermingling or disturbing the existing classification thereof, whereby a progressive concentration over said concentrating-surfaces is effected.

18. In an ore-concentrator, the combination with a plurality of independent classifying concentrating-surfaces, of means for shaking the respective concentrating-surfaces independently of each other to impart classifying movement to the pulp particles, and a chute adapted to deliver desired portions of the more or less classified pulp from one concentrating-surface to a succeeding concentrating-surface without substantially intermingling or disturbing the existing classification thereof, whereby a progressive concentration over said concentrating-surfaces is effected.

19. In an ore-concentrator, the combination with a plurality of independent riffled classifying concentrating-surfaces, of means for imparting impulses to the respective concentrating-surfaces independently of each other to impart classifying movement to the pulp particles, and means for delivering desired portions of the more or less classified pulp from one concentrating-surface to a succeeding concentrating-surface without substantially commingling the existing classification thereof, the delivery-terminals of the riffles on each of the independent concentrating-surfaces extending in advanced or staggered relation to the delivery-terminals of the riffles of the preceding surface.

20. In an ore-concentrator, a plurality of independent classifying concentrating-surfaces, means for imparting impulses to the respective concentrating-surfaces independently of each other to impart classifying movement to the pulp particles, means for independently adjusting the concentrating-surfaces to different inclinations, and means for the delivery of desired portions of the more or less classified pulp from one concentrating-surface to a succeeding concentrating-surface without substantially intermingling or disturbing the existing classification thereof, whereby a progressive concentration is effected.

In testimony whereof I hereunto affix my signature in presence of two witnesses.

FRED N. ROGERS.

Witnesses:
CLARA K. ROGERS,
HARRIET B. DYER.